May 1, 1923.
T. M. HOVELL
ANIMAL TRAP
Filed Aug. 31, 1921
1,453,795
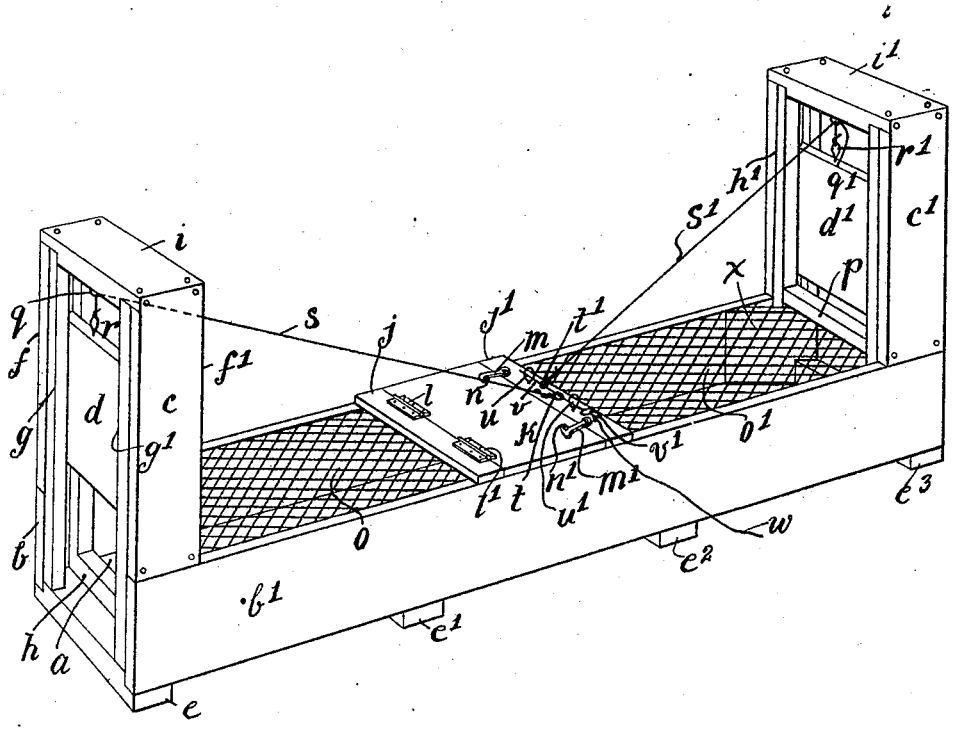
Inventor.
Thomas Mark Hovell
By his Attorney.

Patented May 1, 1923.

1,453,795

UNITED STATES PATENT OFFICE.

THOMAS MARK HOVELL, OF ELSTREE, ENGLAND.

ANIMAL TRAP.

Application filed August 31, 1921. Serial No. 497,278.

*To all whom it may concern:*

Be it known that I, THOMAS MARK HOVELL, Elstree, Herts, England, have invented certain new and useful Improvements in and Relating to Animal Traps, for which I have filed application in England 18th March, 1919, Patent No. 131247, and of which the following is a specification.

My invention relates to animal traps such as those for the capture of rats or other animals and more particularly to traps which although they may be kept constantly set are only sprung by the hand when it is wished to catch the rats which are in the trap. The object of the present invention is to provide a trap of large capacity capable of receiving a large number of rats, but also such that the rats can be readily driven therefrom into a smaller cage when it is desired to clear the trap.

A trap forming a suitable embodiment of my invention is shown in the accompanying drawing, in perspective view. The trap consists of a trough-like box having an opening at each end and covered with wire netting, its length being preferably not less than six feet and its width and height sufficient to allow of a large number of rats assembling therein.

It comprises a floor board $a$, two side boards $b$ $b^1$ and two upright end frames $c$ $c^1$ within which are slide doors $d$ $d^1$ respectively. The floor board and side boards are fastened together and carried on a suitable number of cross bearers $e$ $e^1$ $e^2$ $e^3$. The end frames comprise two side members $f$ $f^1$ of suitable width, slats $g$ $g^1$ are attached to the inner faces of said side members at their outer edges and a frame $h$ or $h^1$ at the inner edge leaving a groove between the slats and frame in which the door $d$ or $d^1$ slides. The side members $f$ $f^1$ are connected above by a transverse member $i$ or $i^1$.

Towards the middle of the trap two cross bars $j$ $j^1$ are fastened upon the upper edges of the side boards $b$ $b^1$ and to one of these cross bars is hinged a door K as by hinges $l$ $l^1$. The door may be held closed by hooks $m$ $m^1$ and studs $n$ $n^1$. Wire netting $o$ $o^1$ closes in the upper part of the trap between the side boards $b$ $b^1$, the cross bars $j$ $j^1$ and other cross bars $p$ at the end frames $c$ $c^1$ respectively.

On the under side of each transverse member $i$ $i^1$ of the end frames is fastened an eyelet $q$ $q^1$. An eyelet $r$ $r^1$ is also secured to the top of each door $d$ $d^1$. Cords $s$ $s^1$ secured to the eyelets $r$ $r^1$ are led through the eyelets $q$ $q^1$ respectively and end in loops $t$ $t^1$. On the cross bar $j^1$ are secured eyelets $u$ $u^1$. A pin $v$ having at one end a loop $v^1$ is passed through the eyelets $u$ $u^1$ and loops $t$ $t^1$ when the trap is set. A cord $w$ is attached to the loop $v^1$ and is led to some distant place for hand operation when it is desired to spring the trap, so that the cord may be pulled and the pin detached without the operator coming sufficiently near the trap to disturb any rats or other animals which may be in it.

This trap is specially designed to be subsequently used with an ordinary cage rat-trap or any box as a cage, fitted with a door and placed at one end opposite the exit door of the trap.

As rats and other animals when frightened, congregate in the corners of a trap, if a cage with a door, narrower than the door of the trap were placed against one end of the trough and the door of the trough at that end lifted so that they might pass from the full width of the trough into the cage, only the rats which run down the side of the trough, which is against the narrow door of the cage, would probably escape into the cage, most of those remaining crowding into the corner opposite to the one which they had previously occupied at the further end of the trap.

In order to ensure all the rats in the trough passing at once through the narrow door of the cage and thus save the time which would otherwise be wasted in driving them backwards and forwards until they found the narrow entry into the adjacent cage-trap, a partition X is placed obliquely across part of the end of the trough to reduce the width of the outlet inside the door $d^1$ of the trough trap, thus leaving no corner at the cage end in which rats or other animals can congregate.

The door K is for convenience in placing bait in the trough and for cleaning it.

What I claim as my invention and desire to secure by Letters Patent of the United States is:—

A trap comprising a frame including two side boards; slide doors vertically slidable at each end of said frame and having cords secured thereon; cross bars secured at the center of said frame intermediate the slide doors; a door hinged on one of said cross bars and adapted to latch on said other cross bar; eyelets secured to the last named cross bar; and a pin adapted to slide in said eyelets and be associated with said cords in order to control said doors.

In witness whereof I have signed this specification, in the presence of two witnesses.

T. MARK HOVELL.

Witnesses:
R. HADDAN,
A. MORRELL.